United States Patent [19]

Biles

[11] 4,174,119
[45] Nov. 13, 1979

[54] HOLD-DOWN UNIT FOR PICK-UP TRUCK

[76] Inventor: James A. Biles, 142 McBain Ct., Campbell, Calif. 95008

[21] Appl. No.: 918,909

[22] Filed: Jun. 26, 1978

[51] Int. Cl.² .............................................. B60P 7/00
[52] U.S. Cl. ................................. 280/179 A; 248/505; 24/68 CD; 105/469
[58] Field of Search ....................... 280/179 A, 179 R; 254/55, 56, 164, 165; 24/69 CT, 69 ST, 68 CD; 248/505; 105/469

[56] References Cited

U.S. PATENT DOCUMENTS

| | | | |
|---|---|---|---|
| 2,738,204 | 3/1956 | Ibey | 280/179 A |
| 3,099,055 | 7/1963 | Huber | 24/68 CD |
| 3,508,502 | 4/1970 | Sims | 280/179 A |
| 4,011,974 | 3/1977 | Scarola | 280/179 A |

Primary Examiner—Robert R. Song
Attorney, Agent, or Firm—Townsend and Townsend

[57] ABSTRACT

A device for attachment to an upright post on a bed of a pick-up truck or other vehicle for gripping one end of a tie-down rope to apply tension to the rope to hold pipe or other load on the vehicle when the rope passes over the load and as the opposite end of the rope is secured to the vehicle. The device includes a shiftable, generally upright bar coupled with a jacking unit secured by a bracket to the post. A cam member on the upper end of the bar is used to wedge the rope against the bar after the rope has been passed over the load. Then, by operating the jacking unit, the bar is caused to be lowered, thereby placing tension on the rope and holding the load in a rigid, secure position on the vehicle. The movement of the bar can be reversed to remove the tension by operating the jacking unit in reverse.

7 Claims, 3 Drawing Figures

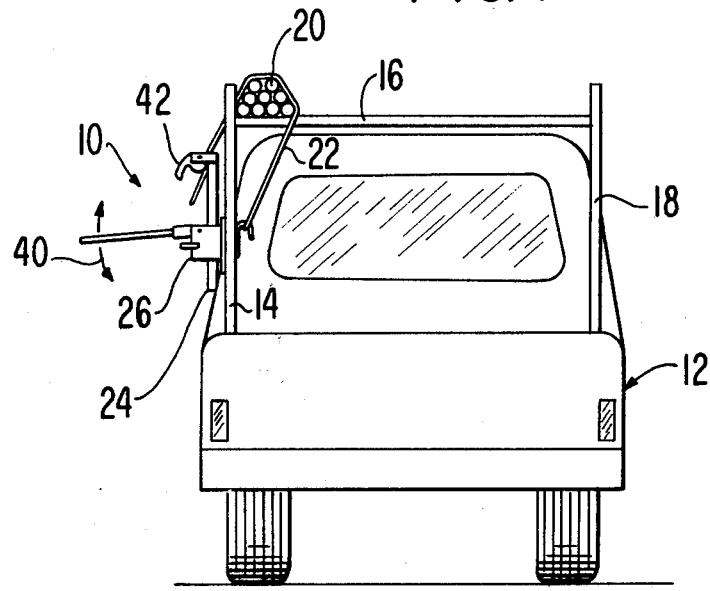
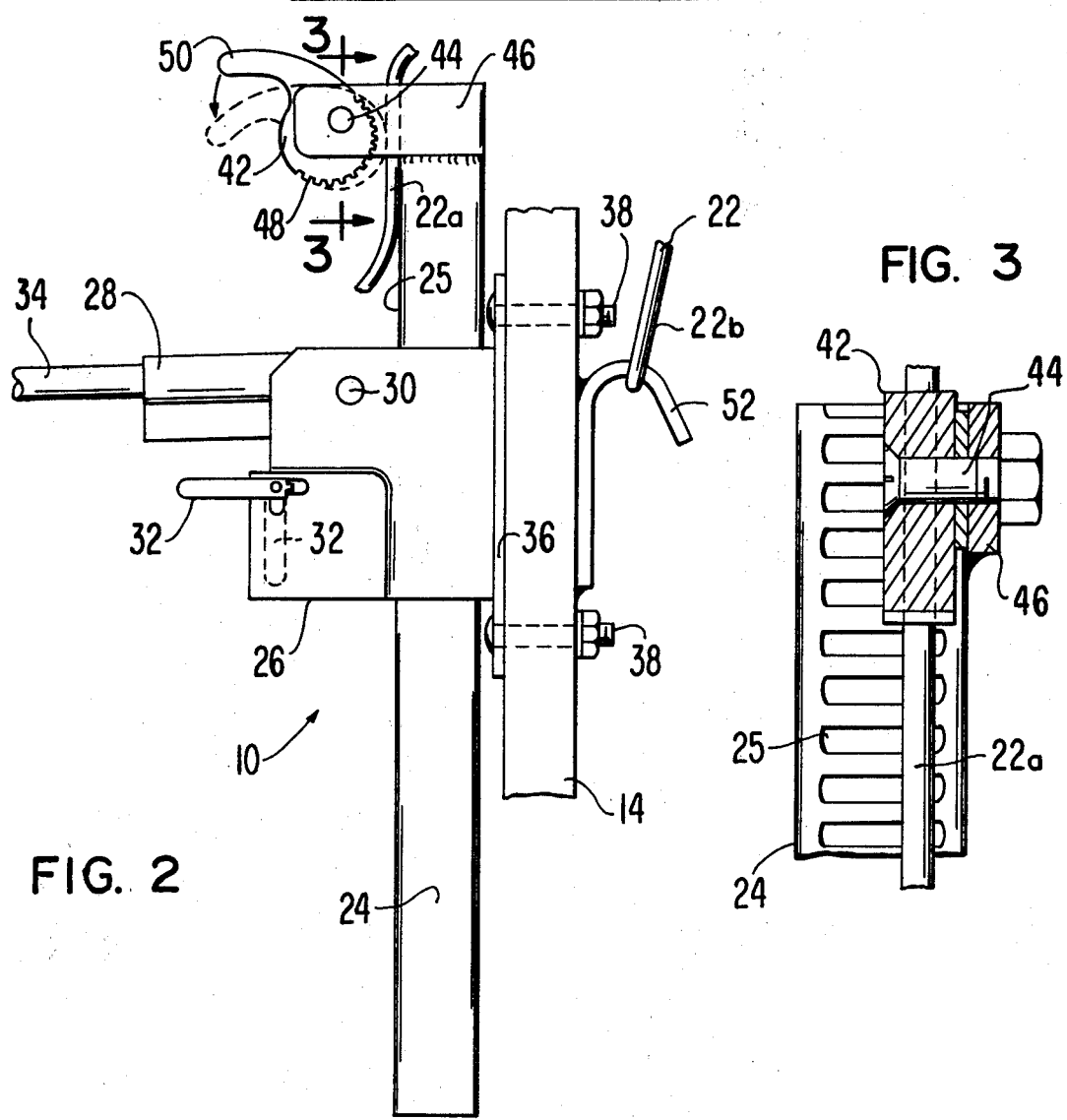

HOLD-DOWN UNIT FOR PICK-UP TRUCK

This invention relates to improvements in the releasable securing of elongated loads, such as pipes and lumber, to vehicles and more particularly, to a unit attachable to a vehicle such as a pick-up truck, for gripping and tightening a tie-down rope to secure an elongated load to the vehicle.

BACKGROUND OF THE INVENTION

The basic concept of using some type of hold-down unit for a truck or vehicle for securing a tie-down rope under tension about a load has been known in the past. A number of different types of units for this purpose, are disclosed in the following U.S. Pat. Nos.: 776,541; 3,090,559; 1,031,357; 3,426,996; 2,628,397; 3,848,889; 2,946,563.

None of the foregoing utilize a jacking unit which incrementally shifts the tie-down rope so that the tension is progressively applied to the rope. Such a jacking unit is easy to operate and is superior to the rotable type of hold-down devices shown in several of the above patents.

Attempts, however, have been made to use a jacking unit for this purpose. In such a case, the rope end attached to such a unit has been wound around a cleat secured to a movable bar coupled to the jacking unit itself. This requires a strong connection between the cleat and the bar and considerable time and expense is required to achieve this aim. Also, the rope, unless it is securely coupled to the cleat, has a tendency to slip, causing tension on the rope to decrease.

Because of the foregoing drawbacks, a need has arisen for an improved hold-down unit which eliminates the problems of this type of jacking unit and allows for a more positive hold-down capability yet without the sacrifice of tension on the tie-down rope.

SUMMARY OF THE INVENTION

The present invention satisfies the aforesaid need by providing an improved hold-down unit using a jacking unit and a bar coupled with the unit, wherein the bar has a cam member at one end thereof for wedging a tie-down rope against the bar to releasably secure the rope to the bar before the jacking unit is operated whereupon the rope is tightened as the jacking unit is operated to shift the bar downwardly relative to the jacking unit and thereby to apply tension to the tie-down rope. The cam means is operated manually and provides a positive, unbreakable but releasable connection between the rope and the bar so that tension is maintained on the rope at all times until the bar is shifted upwardly by reversing the action of the jacking unit.

The primary object of this invention is to provide an improved hold-down unit for a vehicle, such as a pick-up truck, wherein the unit is simple and rugged in construction, can be readily attached to a load carrying vehicle, and can be quickly and easily put into use for applying tension to a tie-down rope to secure an elongated load to the vehicle itself.

Another object of the present invention is to provide an improved hold-down unit of the type described wherein the unit has a jacking device associated with a shiftable bar which carries a cam wedging member at one end thereof so that a tie-down rope can be quickly and easily coupled to the bar and the jacking unit operated to shift the bar so as to apply tension to th tie-down rope and thereby secure an elongated load to the vehicle to which the unit is attached.

Other objects of this invention will become apparent as the following specification progresses, reference being had to the accompanying drawing for an illustration of the invention.

IN THE DRAWING

FIG. 1 is a rear elevational view of a pick-up truck having the hold-down unit of the present invention mounted thereon;

FIG. 2 is an enlarged, rear elevational view of the hold-down unit showing the way it is mounted on an up right post on the truck; and FIG. 3 is an enlarged, cross-sectional view taken along line 3—3 of FIG. 2.

The hold-down unit of the present invention is broadly denoted by the numeral 10 and is adapted to be mounted on the side of a vehicle, such as a pick-up truck 12. For purposes of illustration, truck 12 has an upright post 14 coupled thereto and extending upwardly from one side of the bed of the truck. Post 14 is adapted to be coupled by a cross piece 16 to a second post 18 on the opposite side of truck so that the post and cross piece can form a framework for supporting a load, such as a group of pipes 20. Hold-down unit 10 is adapted to apply tension to a flexible tie-down member or rope 22 so that the rope will apply a force to the load to hold it securely to the frame defined by post 14 and cross piece 16.

Hold-down unit 10 includes a generally vertical bar 24 shiftably mounted in a jacking unit 26 of the type having a pivotal lever 28 mounted for pivotal movement about a pin 30 to cause so the bar to move up or down. The bar and jacking unit are of the type used in conventional automobile bumper jacks wherein the bar has teeth on one face 25 which cooperate with a ratchet (not shown) in jacking unit 26 except in the conventional automobile bumper jack, the jacking unit moves and the bar remains stationary. The direction of movement of the bar relative to the jacking unit is determined by the operating position of a second pivotal lever 32. For instance, when lever 32 is in the full-line position shown in FIG. 2, bar 24 will move downwardly relative to jacking unit 26, assuming the latter to be in a fixed position on the truck. Conversely, when lever 32 is in the dashed line position of FIG. 2, bar 24 will be shifted upwardly relative to jacking unit 26 as lever 28 is moved up and down. A rod 34 is removably coupled to lever 28, the latter being tubular, to facilitate the up and down movement of lever 28. Bar 24 is hollow and has an open top to receive rod 34 for storage.

Jacking unit 26 has a back plate 36 which is secured to bolts 38 to post 14 intermediate the ends thereof as shown in FIG. 1. When back plate is mounted on the post, lever 28 extends outwardly from the post so that rod 34 can be inserted into the lever and moved up and down in a direction of the curved arrow 40 (FIG. 1) to raise or lower bar 24 relative to the jacking unit 26.

A cam 42 is pivotally mounted by a pin 44 on a rigid projection 46 secured to and extending laterally from the upper end of the bar. The cam is provided with a serrated, curved outer surface 48 which is eccentric relative to the axis of pin 44. Moreover, the cam has an arm 50 projecting laterally therefrom so that the cam can be manually rotated from the full line position of FIG. 2 to the dashed line position to wedge a portion 22a of tie-down member 22 against the toothed face 25 of bar 24. The cam will tightly wedge the rope against the bar so that there will be no slippage between the rope and the cam.

In use, tie-down member 22 has a loop 22b received by a hook 52 (FIG. 2) rigid to the opposite side of post 14. Then the tie-down member is passed over the load 20 and then inserted between cam surface 28 and toothed surface 25 of bar 24. Then, the cam is moved in a counterclockwise sense when viewing FIG. 2 from a full-line position of FIG. 2 to the dashed line position to wedge rope portion 22a against the bar. Then, jacking unit 26 is actuated to cause bar 24 to move downwardly and, as it does, the bar applies tension to the rope to assure a positive holding force for the load on cross piece 16.

To release the tension, lever 32 is moved to the dash line position and lever 28 is then reciprocated, causing bar 24 to be elevated relative to the jacking unit. As soon as the tension is removed from the rope, cam 50 is rotated in a clockwise sense and the rope can be removed so that the load can be taken off cross piece 16.

I claim:

1. A hold down unit for applying tension to a flexible tie-down member comprising: a bar; an actuatable jacking unit having a passage therethrough for receiving the bar and providing with means engageable with the bar for selectively moving the bar in either of a pair of opposed directions, said jacking unit having means for attaching the same to a side of a vehicle or an upright post of same; and cam means on the bar for urging a tie-down member into frictional engagement with the bar so that, when the bar is moved in one direction upon bar of the jacking unit, tension will be applied to the tie-down member when the opposite end of the tie-down member is secured to the vehicle, said jacking unit being actuatable in reverse to shift the bar in the opposite direction to remove the tension on the tie-down member.

2. A hold-down unit as set forth in claim 1, wherein said cam means comprises a lever having means pivotally mounting the same on the bar near the normally uppermost end thereof.

3. A hold-down unit as set forth in claim 2, wherein the lever is provided with a curved outer surface, the axis of pivoting movement of the lever being eccentric with reference to the curved outer surface and spaced laterally from the bar.

4. A hold-down unit as set forth in claim 1, wherein said cam means comprises a rotatable cam having a serrated outer surface for engaging the tie-down member, and a rigid projection extending laterally from the bar, said cam being rotably mounted on the projection near the outer end thereof.

5. A hold-down unit as set forth in claim 4, wherein the cam is rotably mounted on the bar near the normally uppermost end thereof.

6. A hold-down unit as set forth in claim 1, wherein is included a plate secure to the jacking unit, there being a number of fasteners on the plate or back portion of jacking unit for securing the same to the side of a vehicle.

7. A hold-down unit as set forth in claim 1, wherein said bar is hollow and has an open top, said jacking unit having a tubular actuator arm movable up and down, and including an L-shaped rod for moving the actuator arm in an up-and-down movement, said rod being receivable in the open top of the bar for storage thereby.

* * * * *